(12) United States Patent
Donescu et al.

(10) Patent No.: US 6,674,873 B1
(45) Date of Patent: Jan. 6, 2004

(54) METHOD AND DEVICE FOR INSERTING AND DETECTING A WATERMARK IN DIGITAL DATA

(75) Inventors: Ioana Donescu, Rennes (FR); Eric Majani, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/417,100

(22) Filed: Oct. 13, 1999

(30) Foreign Application Priority Data

Oct. 30, 1998 (FR) .............................. 98 13672

(51) Int. Cl.⁷ ................................. G06K 9/00
(52) U.S. Cl. ........................ 382/100; 713/176
(58) Field of Search ................... 382/100, 232, 382/240; 380/54, 210, 252, 287, 51; 713/176, 179; 348/461, 465, 463; 370/522, 523, 524, 525, 529, 527; 725/20, 22

(56) References Cited

U.S. PATENT DOCUMENTS

| | | | |
|---|---|---|---|
| 5,727,092 A | | 3/1998 | Sandford, II et al. |
| 5,854,673 A | * | 12/1998 | Beale et al. .................. 356/71 |
| 6,192,139 B1 | * | 2/2001 | Tao ............................ 382/100 |
| 6,285,775 B1 | * | 9/2001 | Wu et al. .................... 382/100 |
| 6,332,030 B1 | * | 12/2001 | Manjunath et al. .......... 382/100 |
| 6,332,194 B1 | * | 12/2001 | Bloom et al. .............. 713/176 |
| 6,359,998 B1 | * | 3/2002 | Cooklev .................... 382/100 |
| 6,373,974 B2 | * | 4/2002 | Zeng ......................... 382/135 |

OTHER PUBLICATIONS

"Multiresolution Scene–Based Video Watermarking Using Perceptual Models," M.D. Swanson, et al., IEEE Journal on Selected Areas in Communications, vol. 16, No. 4, May 1, 1998, pp. 540–550, XP000765114.

"Secure Spread Spectrum Watermarking for Multimedia," J. I. Cox, et al., IEEE Transactions on Image Processing, vol. 6, No. 12, Dec. 1, 1997, pp 1673–16836, XP000724633.

"Watermarking of MEPG–2 Encoded Video Without Decoding and Re–Encoding," Proceedings of the SPIE, vol. 3020, No. 132, Feb. 10, 1997, pp. 264–274, XP002085793.

* cited by examiner

Primary Examiner—Bhavesh M. Mehta
Assistant Examiner—Abolfazl Tabatabai
(74) Attorney, Agent, or Firm—Fitzpatrick, Cella, Harper & Scinto

(57) ABSTRACT

The invention concerns a method of inserting an additional information item in a set of digital data representing physical quantities, the data having been processed by transformation, quantization and entropic coding in order to be compressed, characterized in that it comprises the steps of extracting a subset of low-frequency coefficients, from the set of data, entropic decoding of the coefficients of the subset, modulation of the decoded coefficients by a signal representing the additional information item, so as to form quantized watermarked coefficients, entropic coding of the watermarked coefficients, and insertion of the watermarked encoded coefficients in place of the coefficients of the subset, in the set of data.

48 Claims, 15 Drawing Sheets

_US 6,674,873 B1_

METHOD AND DEVICE FOR INSERTING AND DETECTING A WATERMARK IN DIGITAL DATA

FIELD OF THE INVENTION

The present invention concerns a method and device for inserting a supplementary item of information, such as a secret watermark, in digital data.

It also concerns a method and device for decoding such a supplementary information item inserted by the insertion method according to the invention.

It falls in general terms within the technical field of watermarking of digital data.

BACKGROUND OF THE INVENTION

The proliferation of exchanges of digitized multimedia data by computer is assisting the creation and distribution of illicit copies and, in general terms, the illegal manipulation of data.

In order to limit this illegal manipulation, watermarking of the digital data is used, which consists of inserting a watermark directly in the digital data, for the purpose, for example, of identifying the owner, the sender or the addressee of the data. Inserting this watermark is similar to the coding of an additional information item in the digital data.

A conventional watermarking consists of inserting a visible logo when the digital data are images. Nevertheless, this watermark is easy to remove for a user who wishes to illegally manipulate this image.

Use is then frequently made of a watermark which must exhibit the following quality factors:

Said watermark must be imperceptible, that is to say the insertion of such a watermark must preserve the perceptual quality of the digital data, for example the visual quality for images or the auditory quality for audio data. The imperceptibility of the watermark also makes it more difficult to pirate it.

Said watermark must also be indelible, that is to say be statistically undetectable in the watermarked digital data so as to resist intentional attacks for destroying the watermark.

Said watermark must also be robust vis-a-vis conventional processing applied to digital data, such as compression and decompression, digital/analog conversion, filtering etc.

Finally, said watermark must be reliable, that is to say must allow a reliable decision with regard to the existence or otherwise of a given watermark in given digital data.

Known watermarking methods apply to non-compressed images. However, in many practical cases, a compressed image is at hand, for example delivered by a digital photographic apparatus.

It is therefore advantageous to insert a watermark in compressed data.

The document U.S. Pat. No. 5,727,092 proposes for example a method of inserting additional data in a set of compressed data. The method includes an entropic decoding of the set of compressed data, followed by the insertion of additional data in the set of decoded data, and then an entropic recoding of the set of watermarked data.

The additional data which were inserted were binary data, where the number of bits, and the insertion "location" depend on the particular statistical properties of the set of compressed data which is being processed.

To this end, during a prior analysis step, a search is made in the set of compressed data which is being processed, for similar coefficient pairs, that is to say ones having values close together and similar frequencies of occurrence. These pairs, specific to the set of data being processed, are used for inserting the additional data.

A key representing the pairs used must be added to the coded data in order to be able to subsequently extract the additional information.

This method consequently entails operations on all the coefficients of the set of data to be watermarked. These operations require time and memory space.

In addition, the result is not robust to subsequent operations, such as filtering, which can introduce errors.

The document "Robust image watermarking in the subband or discrete cosine transform domain", which appeared in the conference proceedings EUSIPCO 98 (Sep. 8–12, 1998), pages 2285–2288, proposes a watermarking method which is robust to compression. This method uses non-quantized low-frequency coefficients of the signal to be watermarked, which is not compressed.

This method is advantageously used where the low-frequency coefficients are subsequently quantized very finely compared with all the other sub-bands, or even are not quantized at all. Compression is effected after watermarking.

These two documents show that, up to the present time, it was not envisaged to effect a robust watermarking on compressed data, the constraints peculiar to each of these two aspects being different.

SUMMARY OF THE INVENTION

The present invention aims to remedy the drawbacks of the prior art, by providing a method and a device for inserting an additional information item in compressed digital data, which are both more robust and more rapid than those of the prior art.

To this end, the invention proposes a method of inserting an additional information item in a set of digital data representing physical quantities, the data having been processed by transformation, quantization and entropic coding in order to be compressed, characterised in that it comprises the steps of:

extracting a subset of low-frequency coefficients, from the set of data, entropic decoding of the coefficients of said subset, modulation of the decoded coefficients by a signal representing the additional information, so as to form quantized watermarked coefficients, entropic coding of the watermarked coefficients, insertion of the watermarked encoded coefficients in place of the coefficients of the subset, in the set of data.

Correlatively, the invention proposes a device for inserting an additional information item in a set of digital data representing physical quantities, the data having been processed by transformation, quantization and entropic coding in order to be compressed, characterised in that it comprises:

means of extracting a subset of low-frequency coefficients, from the set of data, means of entropic decoding of the coefficients of said subset, means of modulation of the decoded coefficients by a signal representing the additional information, so as to form quantized watermarked coefficients, means of entropic coding of the watermarked coefficients, means of insertion of the watermarked encoded coefficients in place of the coefficients of the subset, in the set of data.

The method and device according to the invention make it possible to insert an additional information item in compressed digital data, rapidly, whilst offering good degree of robustness.

The watermarking signal is inserted on a sub-sampled version of the image, which makes it possible to form only a partial entropic decoding of the set of compressed data.

The number of operations performed on the compressed data is thus limited. The calculation complexity remains low.

The inventors have shown that the processing carried out according to the invention is robust. This is notably due to the fact that it is performed on quantized coefficients, which undergo no dequantization. The method according to the invention is therefore totally independent of any quantization operation.

In addition, the invention presents the advantage of substantially preserving the size of the compressed file, which therefore makes it possible to add information without losing the advantage of compression.

According to a preferred characteristic, the signal representing the additional information is a pseudo-random signal. This type of signal makes it possible to insert secret information, which is difficult to detect or imitate.

According to another preferred characteristic, the modulation step includes a spectral breakdown of the set of low-frequency coefficients in order to extract therefrom a second subset of low-frequency coefficients, the modulation of the coefficients of the second subset by the signal representing additional information, and a transformation, which is the reverse of the spectral breakdown, of the subset of low-frequency coefficients containing the second subset of modulated coefficients.

Thus the insertion of the watermarking is effected over a limited number of coefficients. Preferably, the extracted subset is the subset of the coefficients with the lowest frequency resulting from the breakdown. Thus the insertion of the watermarking is effected on the very low frequencies of the image, which improves still further the robustness and imperceptibility of the watermarking.

The invention also concerns a method of detecting an additional information item in a set of digital data representing physical quantities, the data having been processed by transformation, quantization and entropic coding in order to be compressed prior to the insertion of the additional information, characterised in that it comprises the steps of:

extracting a subset of low-frequency coefficients, from the set of data, entropic decoding of the coefficients of the said subset, calculation of the correlation between the said subset and a signal representing the additional information, and comparison of the result of the correlation with a threshold.

The invention also concerns a device for detecting an additional information item in a set of digital data representing physical quantities, the data having been processed by transformation, quantization and entropic coding in order to be compressed prior to the insertion of the additional information, characterised in that it comprises:

means of extracting a subset of low-frequency coefficients, from the set of data, means of entropic decoding of the coefficients of the said subset, means of calculation of the correlation between the said subset and a signal representing the additional information, and means of comparison of the result of the correlation with a threshold.

The detection method and device make it possible to detect whether or not a given watermarking is present in the processed data.

The invention also relates to a digital signal processing apparatus, such as a digital photographic apparatus, a digital camera, a database management system, a computer, a scanner, or a medical imaging apparatus, having means of implementing the insertion method, or the detection method, or including the insertion device, or the detection device, as disclosed above.

The advantages of the insertion device, of the detection device and method and of this digital apparatus are identical to those of the insertion method previously disclosed.

The invention also relates to recording means, integrated or not into the device, possibly removable, which store a program implementing the insertion or respectively detection method.

BRIEF DESCRIPTION OF THE DRAWINGS

The characteristics and advantages of the present invention will emerge more clearly from a reading of a preferred embodiment illustrated by the accompanying drawings, in which.

DESCRIPTION OF THE PREFERRED EMBODIMENTS

In the following example, and by way of non-limitative example, the digital data consist of a series of digital samples representing an image I.

The additional information is a secret watermark which is desired to be inserted in the image I in an imperceptible and robust fashion. This secret watermark can for example make it possible to identify the creator or owner of the image I. This additional information is composed in this example of a digital watermarking signal W generated by a confidential key K. This watermarking signal W is inserted in the image I.

There are two categories of watermarking, which differ mainly through the use which is made of them and through the structure of the decoder. The first category of watermarking consists of inserting a predetermined watermarking signal, which it will then be attempted to detect in a decoding phase. This detection assumes the knowledge, and the time of decoding, of the watermarking signal used.

The second category of watermarking consists of inserting a watermarking signal, which it will then be attempted to extract in a decoding phase, without having any a priori knowledge thereof.

Figure 1A:
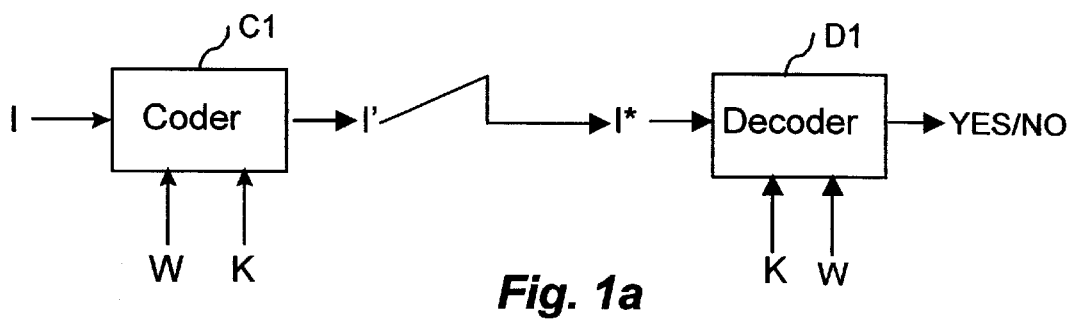
FIG. 1a is an outline diagram of the insertion and detection of an additional information item in a digital signal.
Figure 1B:
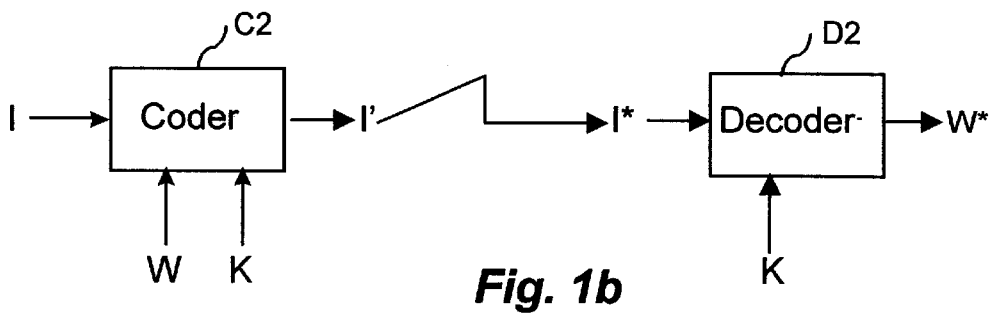
FIG. 1b is an outline diagram of the insertion and extraction of an additional information item in a digital signal.

These two categories are illustrated by FIGS. 1a and 1b.

In general terms, and as illustrated in FIG. 1a, an insertion device is roughly similar to a coder C1 which codes, in an image I, a watermarking signal W defined by a key K. The watermarking signal is for example pseudo-random. A watermarked image I' is supplied at the output of the coder C1.

This image I' can undergo a certain number of processings which can be likened to the addition of a non-linear noise in order to be transmitted or stored, or a digital to analogue conversion in order to be displayed, or a geometric transformation such as a change in scale, or the removal of part of the image, or a filtering.

After processing, the image I*, which corresponds to a noisy version of the watermarked image I', can be transmitted to a decoder D1 associated with the coder C1. This decoder D1 will estimate, in a conventional fashion, using the secret key K and the watermarking signal W, whether the image I* contains an inserted modulation signal W. This detection is based on a correlation measurement, which will be described in detail later in the description with reference to the decoding device and method.

In FIG. 1b, the coder C2 inserts a watermarking signal which is a binary signal having a predetermined number of bits. The key K here makes it possible to personalise the way in which the watermarking signal W is inserted. This watermarking signal is not pseudo-random, and contains information.

The decoder D2 processes the image I* in order to extract, using solely the key K, a watermarking signal W* which is an estimation of the watermarking signal W.

Hereinafter, an example of watermarking insertion/detection is detailed more particularly. Naturally, the invention also applies to the case of watermark insertion/extraction.

Figure 2:
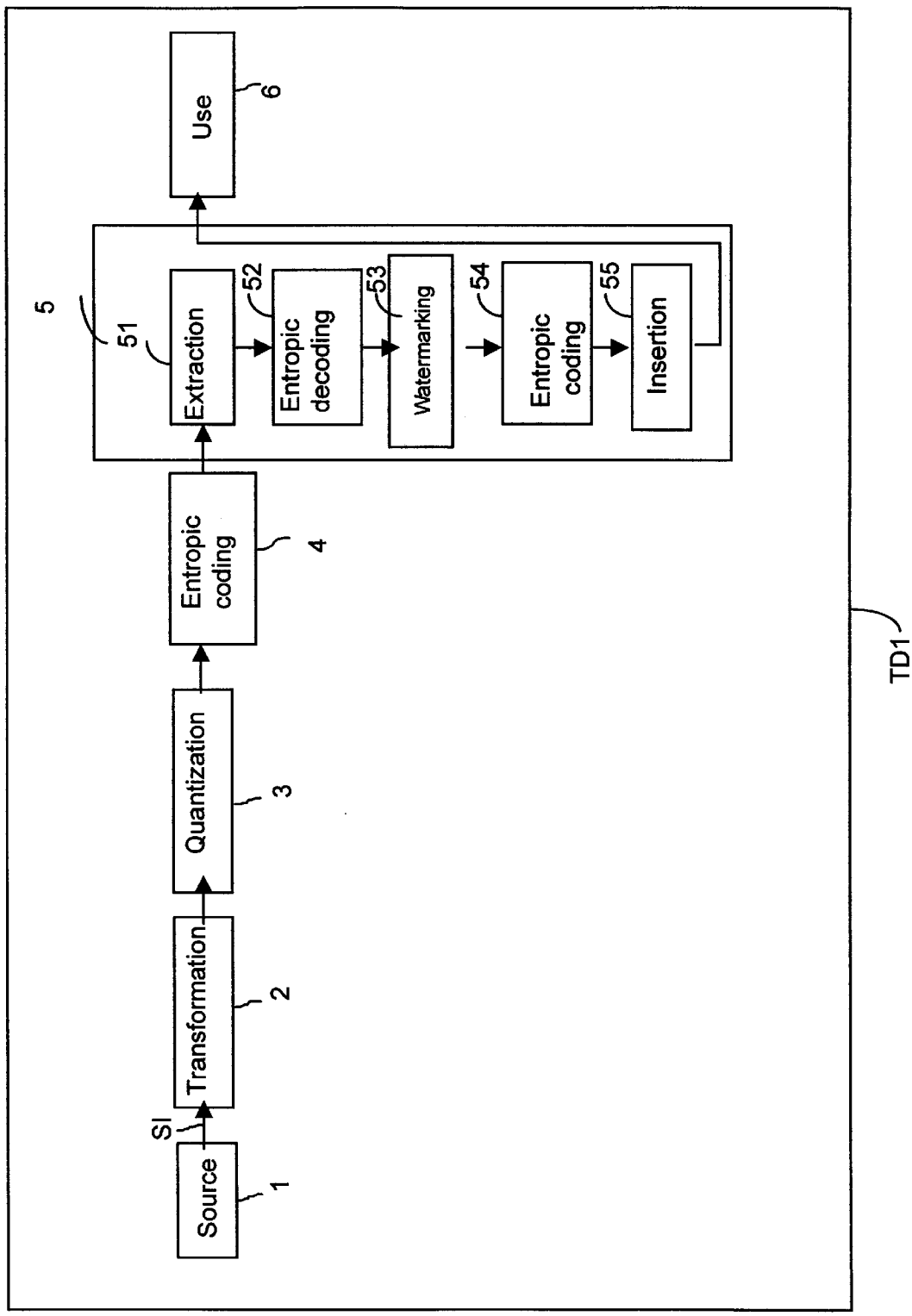
FIG. 2 depicts a device for inserting an additional information item in data, according to the present invention.

According to the embodiment chosen and depicted in FIG. 2, a device for inserting an additional information item in data is integrated into a data processing device TD1, such as a computer, a digital photographic apparatus, or a scanner, for example.

A source 1 of non-coded data has for example a memory means, such as a random access memory, a hard disk, a diskette or a compact disc, for storing non-coded data, this memory means being associated with an appropriate reading means for reading the data therein. A means for recording the data in the memory means can also be provided. The source 1 can also be integrated or not into the digital appliance.

As already stated, it will be considered more particularly hereinafter that the data to be coded are a series of digital samples representing an image I.

The source 1 supplies a digital image signal SI at the input of a transformation circuit 2. The image signal SI is a series of digital words, for example bytes. Each byte value represents a pixel of the image I, here with 256 grey levels, or a black and white image.

In the case of a multispectral image, for example a colour image having components in three frequency bands, of the type red-green-blue or luminance and chrominances, the image is first of all transformed, if necessary, in order to express it through its luminance and chrominance components. The luminance signal is next processed in order to insert the watermarking signal therein, as in the monospectral image, the chrominance components being unchanged by this processing.

The transformations envisaged here are breakdowns of the data signal, so as to effect a frequency analysis of the signal.

The transformation circuit 2 is connected to a quantization circuit 3. The quantization circuit uses a quantization known per se, for example a scalar quantization, or a vector quantization, of the coefficients, or groups of coefficients, of the signals supplied by the circuit 2.

The circuit 3 is connected to an entropic coding circuit 4, which performs an entropic coding, for example a Huffman coding, or an arithmetic coding, of the data quantized by the circuit 3.

The circuits 2, 3 and 4 are conventional and transform data, for example a digital image, into compressed data, in the form of a binary stream.

In an example embodiment which is more particularly considered, the coding performed by the circuits 2, 3 and 4 is a JPEG (Joint Photographic Expert Group) coding, which is frequently used for processing fixed images.

The source image I is broken down into N adjacent square blocks of size 8×8 pixels, where N is an integer. A discrete cosine transformation (DCT) is applied to each block in order to form N blocks of transformed coefficients which have the same size as the initial blocks. For a given block of ranking i, one of the transformed coefficients is a low-frequency coefficient denoted $dc_i$, here a continuous component, and the other 63 coefficients are high-frequency components.

The transformed coefficients are quantized by the circuit 3 by means of a quantization table. The quantization table is itself coded and included in the binary stream containing the coded data so as to be transmitted to the decoder with the coded data.

The quantized coefficients are next supplied to the circuit 4, which performs an entropic coding on the coefficients. The coding used is a Huffman coding or an arithmetic coding. The low-frequency coefficients are coded differently and separately from the high-frequency coefficients, since their statistical distributions are different.

A predictive coding is performed on the low-frequency coefficients, prior to the entropic coding. Each low-frequency coefficient is thus replaced by a differential coefficient. For the first coded block, the prediction for the low-frequency coefficient dc, is then equal to zero. The corresponding differential coefficient $d_1$ is then equal to $dc_1$. For the following blocks, the prediction for the low-frequency coefficient $dc_i$ is equal to the low-frequency coefficient $dc_{i-1}$ of the block previously considered. The differential coefficient $d_i$ is then equal to the difference $(dc_i-dc_{i-1})$.

Several entropic coding tables are generally used. The entropic coding tables are coded in the binary stream, so as to be transmitted to the decoder.

Figure 3:
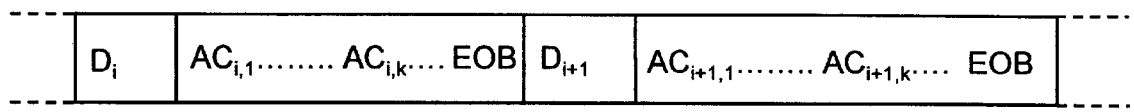
FIG. 3 depicts a portion of a binary stream formed in the device of FIG. 2.

The entropic coding circuit 4 delivers a binary stream containing the data of the compressed image. FIG. 3 depicts a portion of a binary stream, and chosen more particularly the coded data of two successive blocks of the image. The block of ranking i, respectively i+1, is coded by a differential coefficient $D_i$, respectively $D_{i+1}$, and by coded events representing the sequence of high-frequency coefficients $AC_{i,k}$, respectively $AC_{i+1,k}$. The end of a block is marked by an end word EOB.

It should be noted that the blocks of the image are considered and processed in a predetermined order, for example in the video scanning order, and that, in a given block, the coefficients also considered in a predetermined order, for example also in a zigzag from the top left-hand corner to the bottom right-hand corner.

According to the invention, the device has a watermarking circuit 5 which inserts a secret watermark in the data compressed by means of the circuits 2, 3 and 4, here a compressed image.

The watermarking circuit 5 includes a coefficient extraction circuit 51 which extracts a subset of low-frequency coefficients of the compressed image.

The circuit 51 is connected to an entropic decoding circuit 52, which performs an entropic decoding of the coefficients extracted by the circuit 51. The entropic decoding corresponds to the entropic coding performed by the circuit 4, apart from the fact that the entropic decoding relates only to the low-frequency coefficients.

The circuit 52 is connected to a circuit 53 for watermarking the coefficients decoded by the circuit 52. The circuit 53 performs a modulation of the coefficients to be watermarked by means of a watermarking signal.

The circuit 53 is connected to an entropic coding circuit 54, which effects an entropic coding of the coefficients watermarked by the circuit 53. The entropic coding is identical to the entropic coding performed by the circuit 4, apart from the fact that it relates only to the low-frequency coefficients.

The circuit 54 is connected to an insertion circuit 55, which places the watermarked and coded coefficients in place of the extracted coefficients in the binary stream.

It should be noted that the watermarking circuit 5 can be used in a device distinct from the compression device, the two devices then having interfaces for communicating together.

Means 6 using coded data are connected to the output of the watermarking device 5.

The user means 6 includes for example means of storing coded data, and/or means of transmitting coded data.

Figure 4:
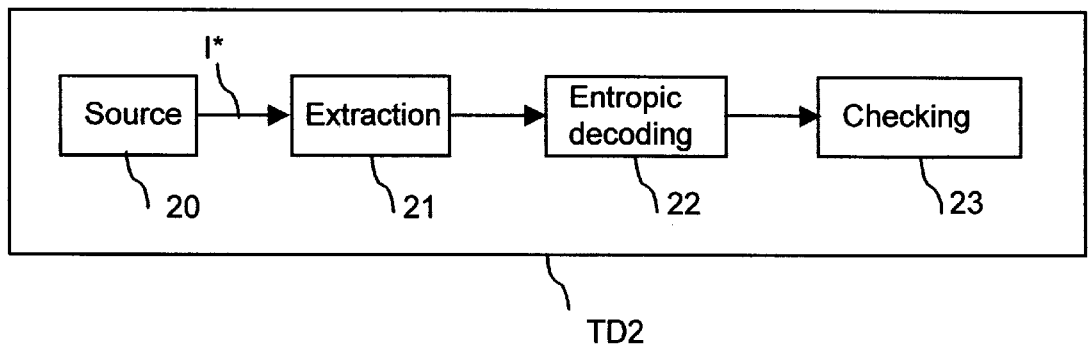
FIG. 4 depicts a device for detecting an additional information item in data, according to the present invention.

A device for detecting additional information, corresponding to the above-mentioned insertion device, it depicted in FIG. 4. This device for detecting an additional information item in data is integrated into a data processing device TD2, such as a computer, a digital photographic apparatus, or a facsimile machine for example.

The detection device has a source 20 of compressed data which here supplies an image which is compressed and possibly watermarked I* to an extraction circuit 21 similar to the previously described circuit 51.

The circuit 21 is connected to an entropic decoding circuit 22 similar to the previously described circuit 52. The circuit 22 is itself connected to a checking circuit 23 which checks whether the image supplied to the device TD2 includes a predetermined watermark. The function of the device TD2 will be disclosed in detail below.

Figure 5:
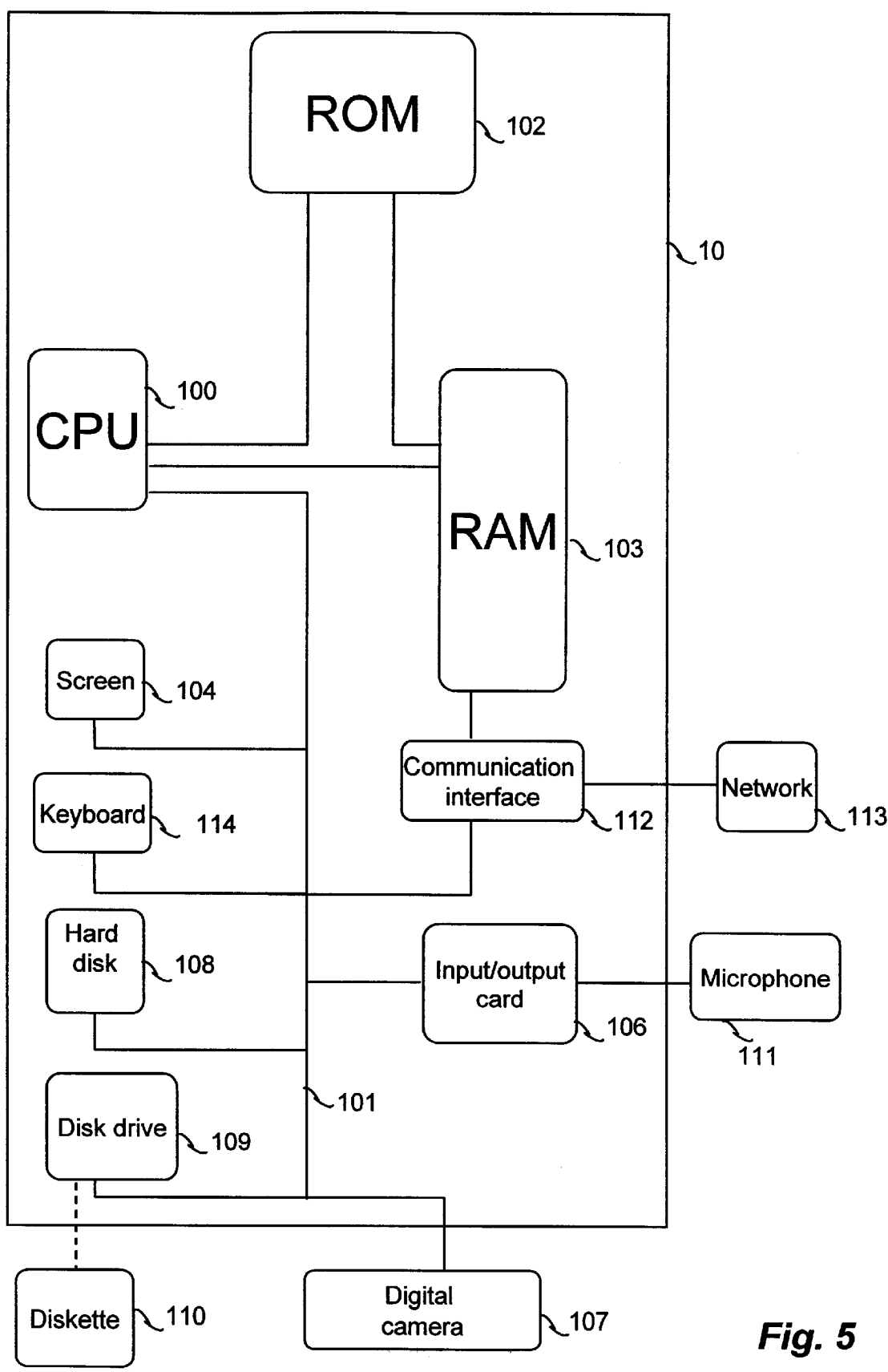
FIG. 5 depicts an embodiment of a device according to the present invention.

With reference to FIG. 5, an example of a device 10 implementing the invention is described. This device is adapted to insert and/or detect a watermarking signal in a digital signal, according to the examples developed below.

The device 10 is here a microcomputer having a communication bus 101 to which there are connected:

a central unit 100, a read only memory 102, a random access memory 103, a screen 104, a keyboard 114, a hard disk 108, a disk drive 109 adapted to receive a diskette 110, an interface 112 for communicating with a communication network 113, an input/output card 106 connected to a microphone 111.

The hard disk 108 stores the programs implementing the invention, as well as the data to be coded and the coded data according to the invention. These programs can also be read on the disk 110, or received via the communication network 113, or stored in the read only memory 102.

In more general terms, the programs according to the present invention are stored in a storage means. This storage means can be read by a computer or by a microprocessor. This storage means is integrated or not into the device, and may be removable. For example, it can have a magnetic tape, a floppy disk or a CD-ROM (fixed-memory compact disc).

When the device is powered up, the programs according to the present invention are transferred into the random access memory 103, which then contains the executable code of the invention and the variables necessary for implementing the invention.

The device 10 can receive data to be coded from a peripheral device 107, such as a digital photographic apparatus, or a scanner, or any other means of acquiring or storing data.

The device 10 can also receive data to be coded from a remote device, via the communication network 113, and transmits coded data to a remote device, again via the communication network 113.

The device 10 can also receive data to be coded from the microphone 111. These data are then a sound signal.

The screen 104 enables a user notably to display the data to be coded, and serves, with the keyboard 114, as a user interface.

The functioning of the watermark insertion device and watermark detection device according to the invention will now be described by means of algorithms.

Figure 6:
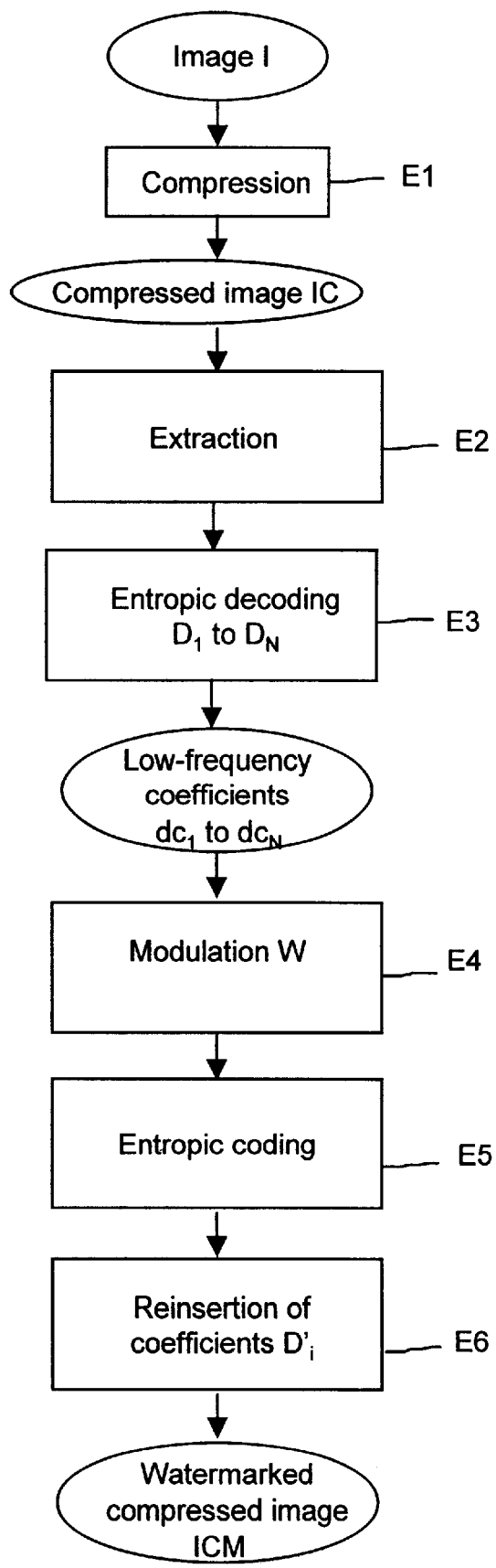
FIG. 6 is a general algorithm for inserting an additional information item in data, according to the present invention.

The algorithm of FIG. 6 depicts the general functioning of the insertion device according to the invention.

Step E1 is the compression of an image I. The image is transformed, quantized and then coded entropically, as previously disclosed. The coding effected is of the JPEG type, or entails in general terms a transformation which results in a spectral and statistical representation adapted for compression, such as a DCT transformation, or a transformation by wavelets. The result of the compression is a compressed image IC.

As depicted in FIG. 3, the compressed image IC is contained in a binary stream.

The following step E2 is an extraction of low-frequency coefficients of the compressed image IC. In the case of encoding of the JPEG type, as already stated, one low-frequency coefficient per block of size 8 times 8 coefficients is extracted, which forms a set, referred to as a sub-image, containing N low-frequency coefficients $D_1$ to $D_N$.

The following step E3 is the entropic decoding of the extracted coefficients $D_1$ to $D_N$. The entropic decoding corresponds to the entropic coding performed at the step E1. Steps E2 and E3 are detailed in FIG. 7.

The result of step E3 is a sub-image containing the decoded low-frequency coefficients $dc_1$ to $dc_N$. These coefficients are quantized.

The following step E4 is the modulation of the sub-image by means of a marking signal W. This step, which will be detailed below, results in a watermarked sub-image, that is to say a set of quantized watermarked coefficients.

Step E4 is followed by step E5, which is the entropic coding of the coefficients of the watermarked sub-image. The entropic coding performed is identical to the entropic coding performed at step E1, apart from the fact that it relates to a smaller number of coefficients. At step E6, these coded coefficients $D'_i$ are then replaced in the compressed image, instead of the processed coefficients. The result is a compressed watermarked image ICM.

Figure 7:
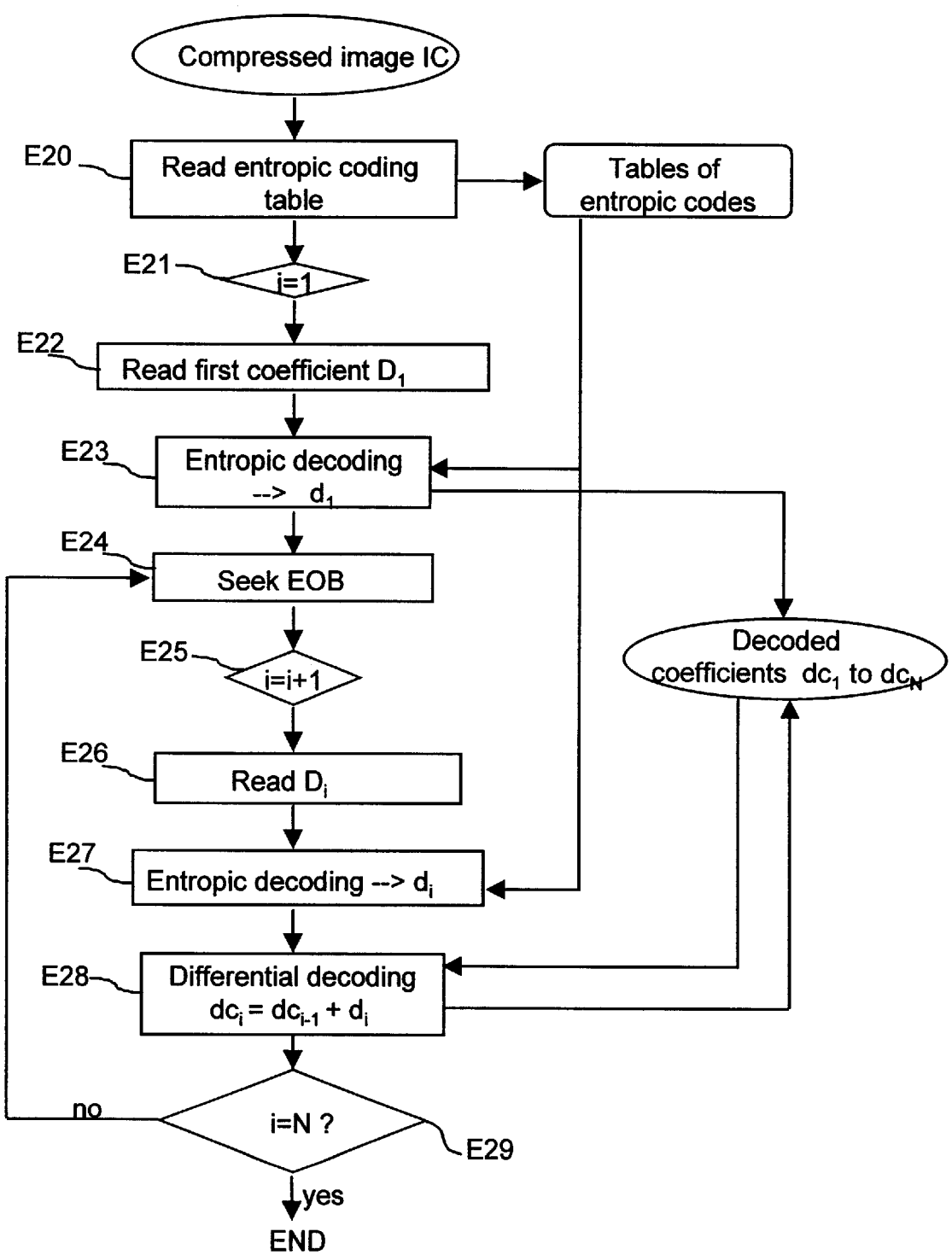
FIG. 7 is an entropic decoding algorithm used in the algorithm in FIG. 6.

FIG. 7 represents in more detail the extraction and entropic decoding of the low-frequency coefficients of the compressed image IC (steps E2 and E3). These operations are performed by steps E20 to E29.

Step E20 is the reading and storage of the entropic coding table in the file containing the binary stream representing the compressed image IC.

The following step E21 is the initialisation of a working parameter i to 1. The parameter i represents the ranking of the low-frequency coefficient in the sub-image.

The following step E22 is the reading of the first low-frequency coefficient $D_i$ in the binary stream.

The following step E23 is the entropic decoding of the coefficient $D_1$, using the entropic coding table read at step E20. The decoded coefficient $d_1$ is equal to the coefficient $dc_1$, which is stored in memory.

The following step E24 is the seeking of the next end of block word EOB in the binary stream.

The following step E25 is the incrementation of the variable i in order to consider the next differential coefficient $D_i$ in the binary stream. This coefficient follows, in the binary stream, the end of block word EOB read at step E24. The differential coefficient $D_i$ is read at step E26.

The following step E27 is the entropic decoding of the differential coefficient $D_i$ by means of the entropic coding table read at step E20. The decoded coefficient is denoted $d_i$.

The following step E28 is the differential decoding which makes it possible to determine the low-frequency coefficient $dc_i$, by means of the formula:

$$dc_i = dc_{i-1} + d_i$$

The result of step E28 is the low-frequency coefficient $dc_i$ which is stored in memory.

The following step E29 is a test for determining whether all the low-frequency coefficients have been decoded. If the response is negative, step E29 is followed by step E24.

When the response is positive at step E29, then the sub-image of the low-frequency coefficients $dc_1$ to $dc_N$ is completely determined. As already stated, these coefficients are quantized quantities.

Naturally, the extraction of the low-frequency coefficients which has been described is an example related to the use of JPEG. For example, in the so-called progressive version of JPEG, the low-frequency information is grouped together in part of the binary stream. It is therefore possible to extract it in a single operation before applying the entropic decoding.

Figure 8:
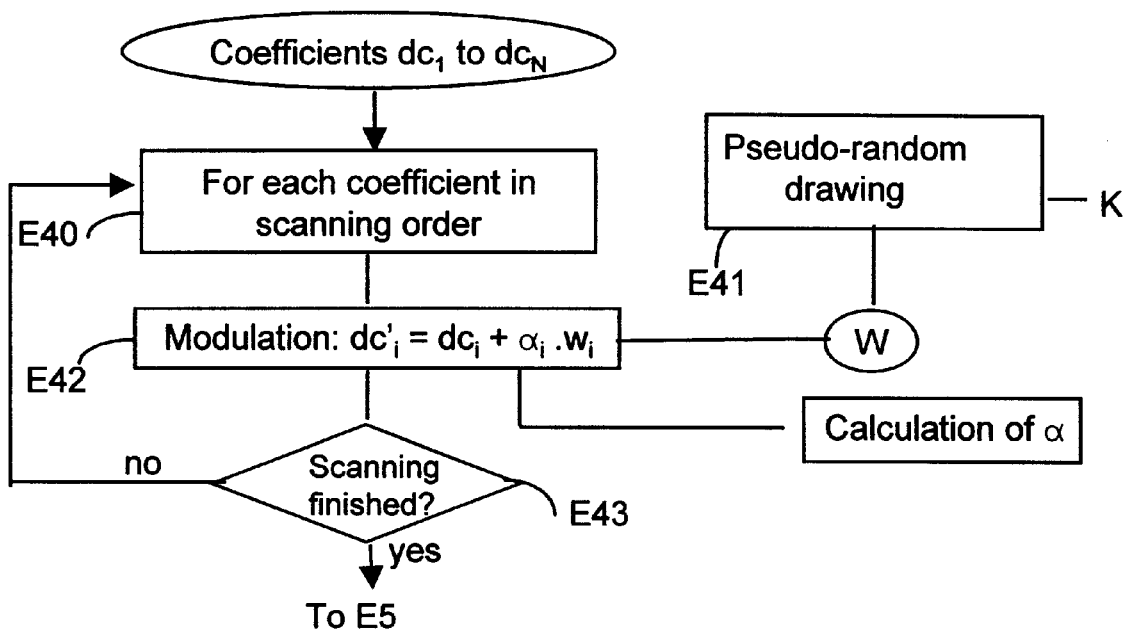
FIG. 8 is a first embodiment of a modulation algorithm used in the algorithm in FIG. 6.

FIG. 8 depicts a first embodiment of modulation, referred to as direct modulation, of the watermarking signal in the sub-image of the low-frequency coefficients $dc_1$ to $dc_N$ determined by steps E20 to E29. This embodiment of modulation includes steps E40 to E43. Preferably, direct modulation uses only quantized quantities, for example integers, which avoids a quantization operation at the end of the modulation.

Step E40 successively considers each of the low-frequency coefficients $dc_i$ of the sub-image, in a predetermined scanning order.

At step E41, a pseudo-random drawing is effected, for example of a binary law, initialised by a number K which is a secret key identifying for example the owner of the image.

The result of the pseudo-random drawing is a pseudo-random signal W including a number N of coefficients $w_i$ equal to the number of coefficients of the image. For example, the coefficients $w_i$ are equal to +1 or −1.

Step E42 is the modulation proper of the watermarking signal on the current low-frequency coefficient $dc_i$ in order to supply a watermarked coefficient $dc'_i$. This modulation is effected according to the formula:

$$dc'_i = dc_i + \alpha_i \cdot w_i$$

In this formula, $\alpha_i$ is an integer which denotes a modulation amplitude which can be chosen in different ways.

Preferably, the modulation amplitude depends on the quantization pitch used for quantizing the low-frequency coefficients, so that the detection threshold which will be used for detecting the watermarking in the image as disclosed hereinafter, is independent of the quantization pitch. For example, if a JPEG coding is considered with a quality factor of at least 75, it is possible to choose $\alpha_i = \text{INT}\{\alpha_0/P\}$, where INT denotes the integer part, P the quantization pitch and $\alpha_0$ can be equal to 8.

The modulation amplitude can be a constant proportional to the quantization pitch used.

The modulation amplitude can be a weighted mean of the low-frequency coefficients close to the current low-frequency coefficient. The quantization pitch is then also automatically taken into account.

The modulation amplitude can take into account the local visibility limit in order to provide psychovisual masking so as to guarantee invisibility of the watermarking.

In all cases, the modulation amplitude is integer.

The following step E43 makes it possible to effect a looping on step E40, for all the coefficients of the sub-image to be processed. When all the coefficients have been processed, the result is a sub-image to which the watermarking signal has been applied. This sub-image contains quantized watermarked coefficients.

Figure 9:
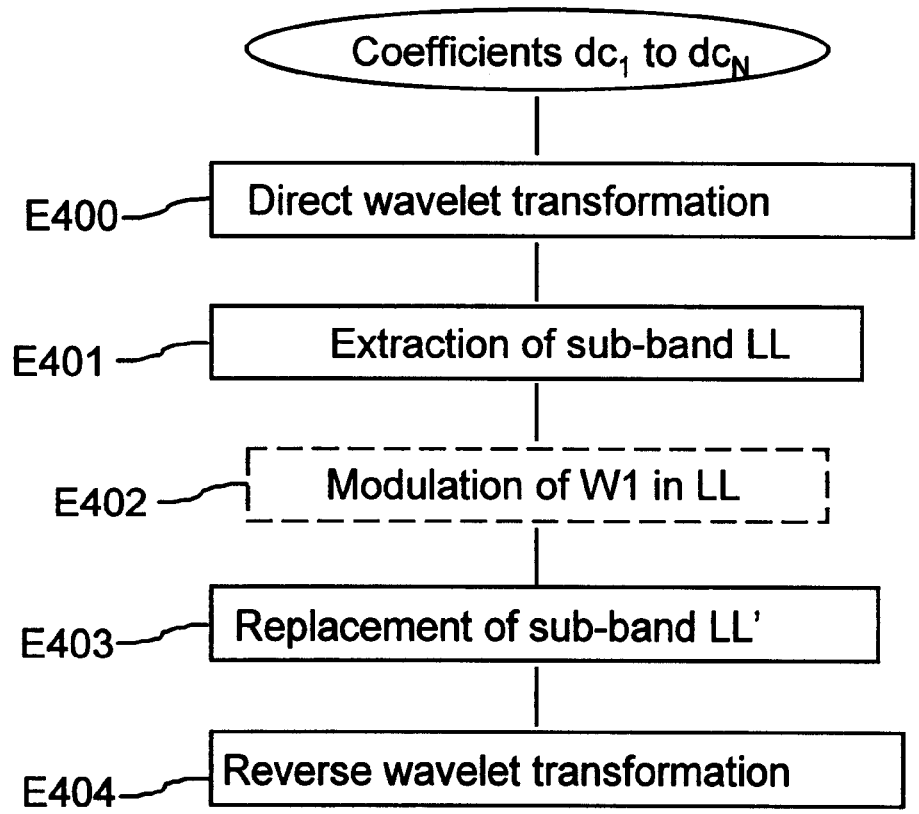
FIG. 9 is a second embodiment of a modulation algorithm used in the algorithm in FIG. 6.

FIG. 9 depicts a second embodiment of a modulation of the watermarking signal (step E4), in the sub-image of the low-frequency coefficients determined by steps E20 to E29. This embodiment of modulation includes steps E400 to E404.

In this embodiment, a spectral transformation is first of all applied to the set of low-frequency coefficients $\{dc_i\}$ before the insertion of the watermarking. This embodiment takes into account the frequency characteristics of the low-frequency coefficients and makes it possible to limit any visible artefacts due to the presence of the watermarking in the image.

Figure 10:
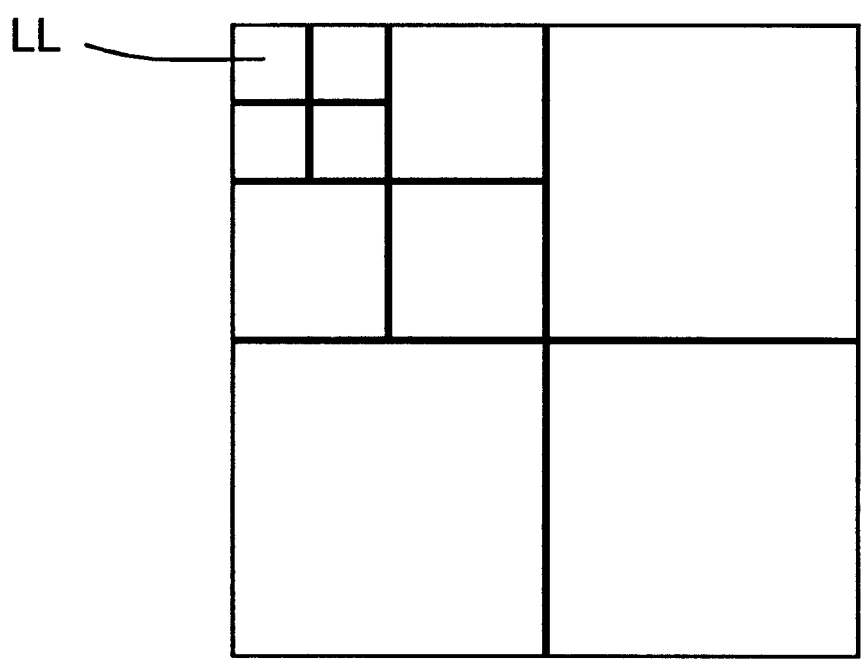
FIG. 10 depicts an image broken down into frequency sub-bands.

Step E400 is a multiresolution spectral breakdown, for example a breakdown into discrete wavelets, of the sub-image. This breakdown of the sub-image $\{dc_i\}$ is conventional and results in sub-band signals according to several resolution levels. For example, the breakdown can result in ten sub-band signals distributed according to three resolution levels, as depicted in FIG. 10. This breakdown is performed on a conventional set of high-pass and low-pass filters associated with decimators.

Step E401 is the extraction of a sub-band signal of the breakdown, for example the sub-band signal LL with the lowest frequency and the lowest resolution in the breakdown. Naturally, it is possible to choose another sub-band in the breakdown.

The following step E402 is the modulation of a watermarking signal W1 on the signal LL extracted at step E401. Step E402 is similar to the previously described steps E40 to E43, applied to the sub-band signal extracted at step E401. The watermarking signal W1 used here has a number of coefficients corresponding to the number of coefficients of the sub-band signal LL extracted at step E401.

Where the spectral breakdown is effected by conventional filtering operations, the quantities obtained are no longer quantized. The modulation is therefore not necessarily performed with quantized quantities, since a quantization will be effected at the end of the modulation.

The coefficients $w_i$ and the modulation amplitude are not necessarily quantized quantities. In particulars, the modulation amplitude can be chosen as previously disclosed, or can also be proportional to the current low-frequency coefficient: $\alpha_i = 0,1 \cdot dc_i$, for example. The quantization pitch is then automatically taken into account.

At the following step E403, the modulated sub-band signal LL' is replaced in the breakdown of the sub-image, in place of the extracted signal LL.

The following step E404 is the reverse transformation to that effected at step E400. Step E404 results in a sub-image to which the watermarking signal has been applied.

Step E404 next includes a requantization of the coefficients of the watermarked sub-image, so that the watermarked coefficient $dc'_i$ is quantized at the integer value closest to its previously calculated value. This quantization operation is therefore a simple numerical rounding, of very low complexity.

Figure 11:
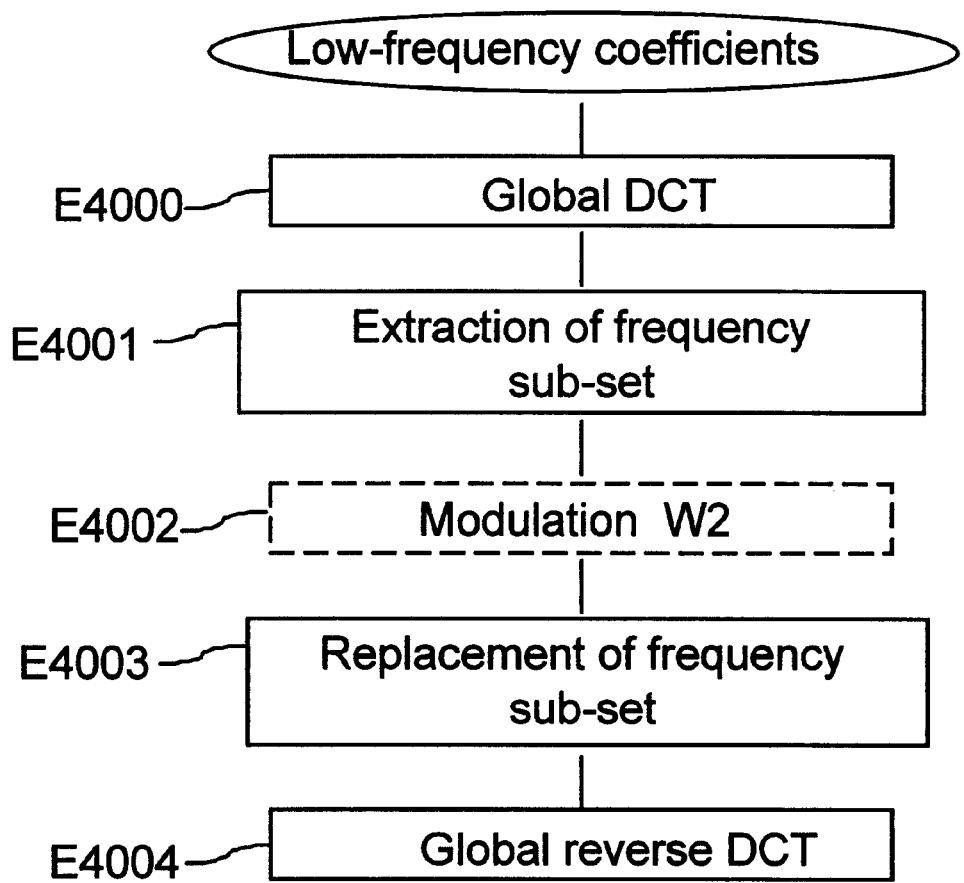
FIG. 11 is a third embodiment of a modulation algorithm used in the algorithm in FIG. 6.

FIG. 11 represents a third embodiment of the modulation of the watermarking signal (step E4) in the sub-image of the low-frequency coefficients determined by steps E20 to E29. This embodiment includes steps E4000 to E4004.

In this embodiment, a spectral transformation different to that of the second embodiment is applied to the set of low-frequency coefficients $\{dc_i\}$ before the modulation proper of the watermarking signal. The spectral transformation is a discrete cosine transformation (DCT), which in addition is here global, that is to say applied to the entire image. This transformation can make it possible to obtain, for certain images, a better compromise between invisibility and robustness of the detection for certain images processed. In addition, this transformation allows a spectral distribution of the watermarking signal adapted to the processed image.

In addition, the set of coefficients in which the watermarking signal is actually modulated is determined in a different fashion from that of the second embodiment (FIG. 9).

Step E4000 consists of the application of a global discrete cosine transformation to the sub-image of the low-frequency coefficients $\{dc_i\}$. This step results in a set of N spectral coefficients, where N is the number of coefficients $\{dc_i\}$ of the processed image. Amongst these N coefficients, a first coefficient is distinguished, which is a "low-frequency" coefficient which represents the mean value of the entire sub-image under consideration.

The second step E4001 consists of the extraction of a subset of P spectral coefficients $X_i$ of the set of N coefficients formed at the previous step, the number P being predetermined. For example, the first spectral coefficient is left intact, and the following P spectral coefficients are extracted in the order of reading in a zigzag, as described in the running through of a block in the JPEG standard. This method is known per se, but it is applied advantageously in this case, since the sub-image of the low-frequency coefficients is of reduced size, which entails a limited number of calculations to effect.

The following step E4002 consists of the modulation of a watermarking signal W2, of length P equal to the number of extracted spectral coefficients $X_i$. This step is similar to the previously described steps E40 to E43, applied to the subset of extracted spectral coefficients.

When the modulation is effected on the extracted coefficients $\{X_i\}$, which, as chosen at step E4001, are "medium frequency" coefficients, it is preferable to take into account also the magnitude of the extracted coefficients. In particular, the amplitude of the modulation can be chosen according to the formula: $\alpha_i = 0,1 \cdot |X_i|$ for example. Thus the magnitude of the coefficients and the quantization pitch are automatically taken into account. Other ways of choosing the modulation amplitude, described previously, can also be applied. It may be noted that the coefficients $X_i$ are not quantized after application of the DCT, and therefore it is not necessary to effect a modulation with a quantized value.

The following step E4003 consists of replacing the spectral coefficients processed at the previous step in the set of spectral coefficients, in the order predetermined at the extraction of step E4001.

The following step E4004 consists of applying the reverse DCT transformation, so as to obtain the set of modulated low-frequency coefficients $dc'_i$. Step E4004 also includes a requantization of the coefficients on the same number of bits as the low-frequency coefficients $dc_i$, which amounts to choosing the integer value closes to the real coefficient $dc'_i$ obtained by reverse transformation.

Figure 12:
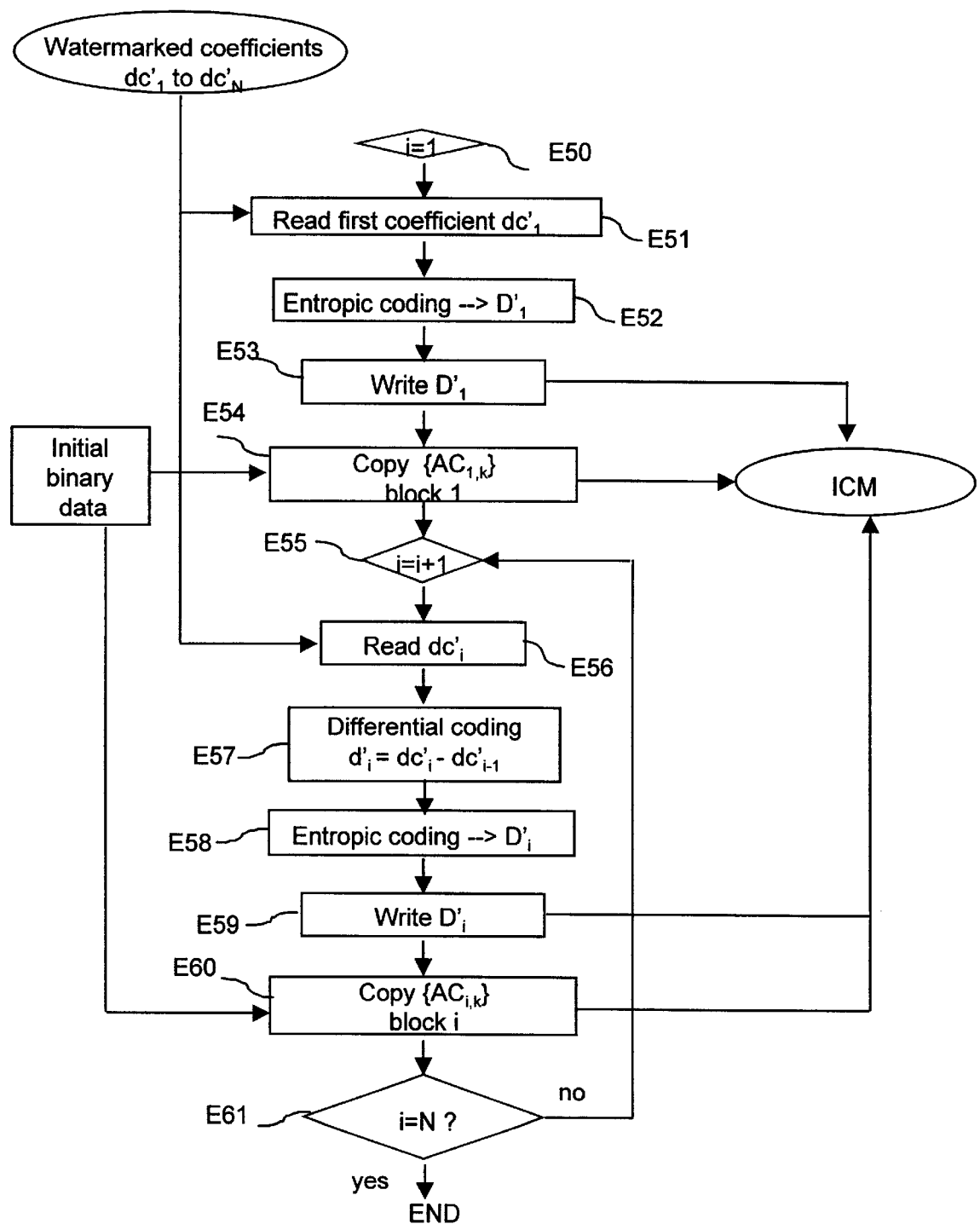
FIG. 12 is an entropic coding algorithm used in the algorithm in FIG. 6.

FIG. 12 depicts the entropic coding and reinsertion of the watermarked coefficients in the image (steps E5 and E6). These operations are effected by steps E50 to E61.

Step E50 is an initialisation at which a working parameter i is initialised to one. The parameter i will serve to consider the watermarked coefficients successively.

The following step E51 is the reading of the first quantized watermarked coefficient $dc'_1$, corresponding to the first block of the image.

The following step E51 is the entropic coding of the previously read coefficient.

The coded coefficient $D'_1$ is stored at the following step E53 in a compressed file which will contain the binary stream corresponding to the compressed and watermarked image ICM.

The following step E54 is the copying into the compressed file of the high-frequency coefficients $\{AC_{1,k}\}$ of the first block currently being processed, which have not been processed by the present invention.

At the following step E55, the parameter i is implemented by one unit in order to consider the following watermarked low-frequency coefficient.

The following step E56 is the reading of the current quantized watermarked low-frequency coefficient $dc'_i$. This coefficient is transformed at step E57 into a differential coefficient $d'_i$ according to the formula:

$$d'_i = dc'_i - dc'_{i-1}.$$

The following step E58 is the entropic coding of the previously determined differential coefficient $d'_i$. The coded differential coefficient $D'_i$ is then stored in the compressed file at step E59.

The following step E60 is the copying of the high-frequency coefficients $\{AC_{i,k}\}$ of the current block of index i in the compressed file.

The following step E61 is a test for determining whether all the blocks of the image under consideration have been run through. As long as there remains at least one block to be processed, step E61 is followed by the previously described step E55.

When all the blocks have been processed, the compressed file contains the compressed and watermarked image ICM.

The processing carried out on an image I* which has been compressed will now be considered, in order to determine whether a predetermined known watermarking is present in the image. This processing is carried out in the decoder, or detection device, previously described.

Figure 13:
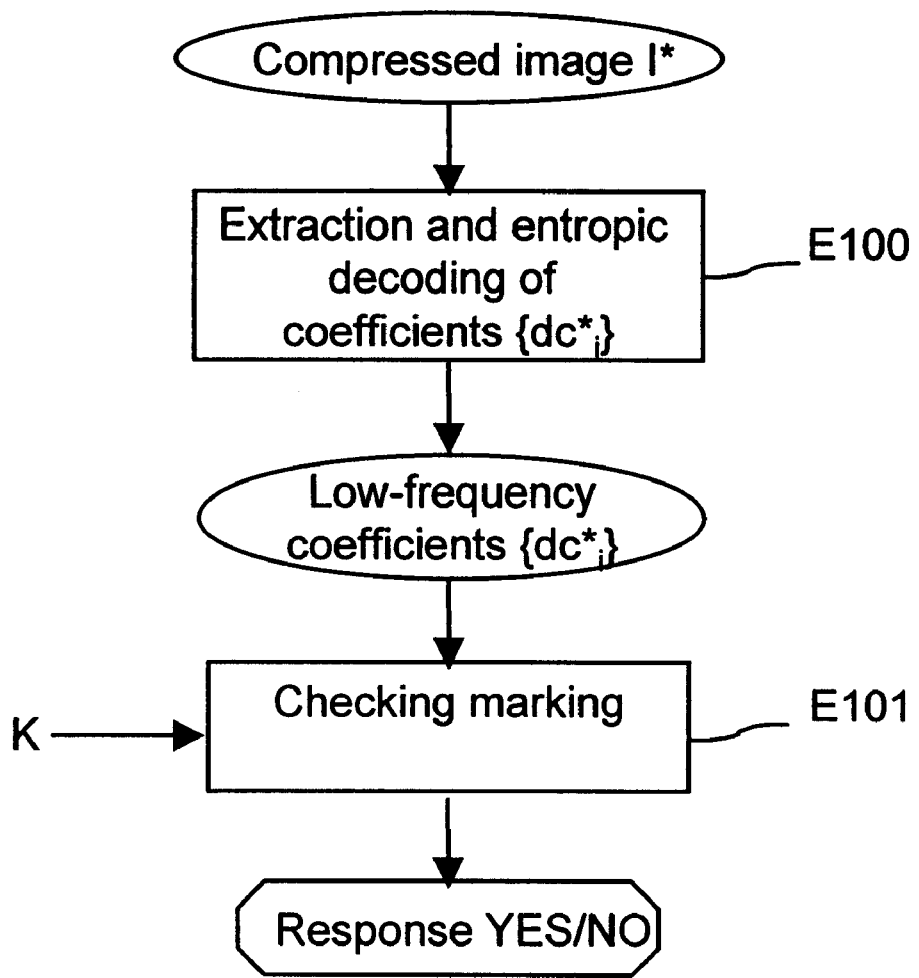
FIG. 13 is a first embodiment of an algorithm for detecting additional information in data, according to the present invention.

FIG. 13 depicts a first embodiment of the watermarking detection which makes it possible to process a file containing a compressed image I*. This detection is effected in the decoder and includes steps E100 and E101.

Step E100 is the extraction and entropic decoding of the low-frequency coefficients of the compressed image. These operations are identical to those previously described for the coding (steps E2 and E3 and E20 to E29) and result in the sub-image of the low-frequency coefficients $\{dc^*_i\}$.

According to variant embodiments, it is impossible then to effect a conventional filtering of these coefficients in order to eliminate noise, which improves the detectability of the watermarking signal. It is also possible to centre all the coefficients.

The sub-image of the low-frequency coefficients $\{dc^*_i\}$ is processed at the watermarking checking step E101. This step consists of seeking whether the watermarking W (or W1) is present in the compressed image. Two embodiments of step E101 are detailed below.

Step E101 results in a binary response, representing the recognition or not of watermarking in the processed compressed image.

Figure 14:
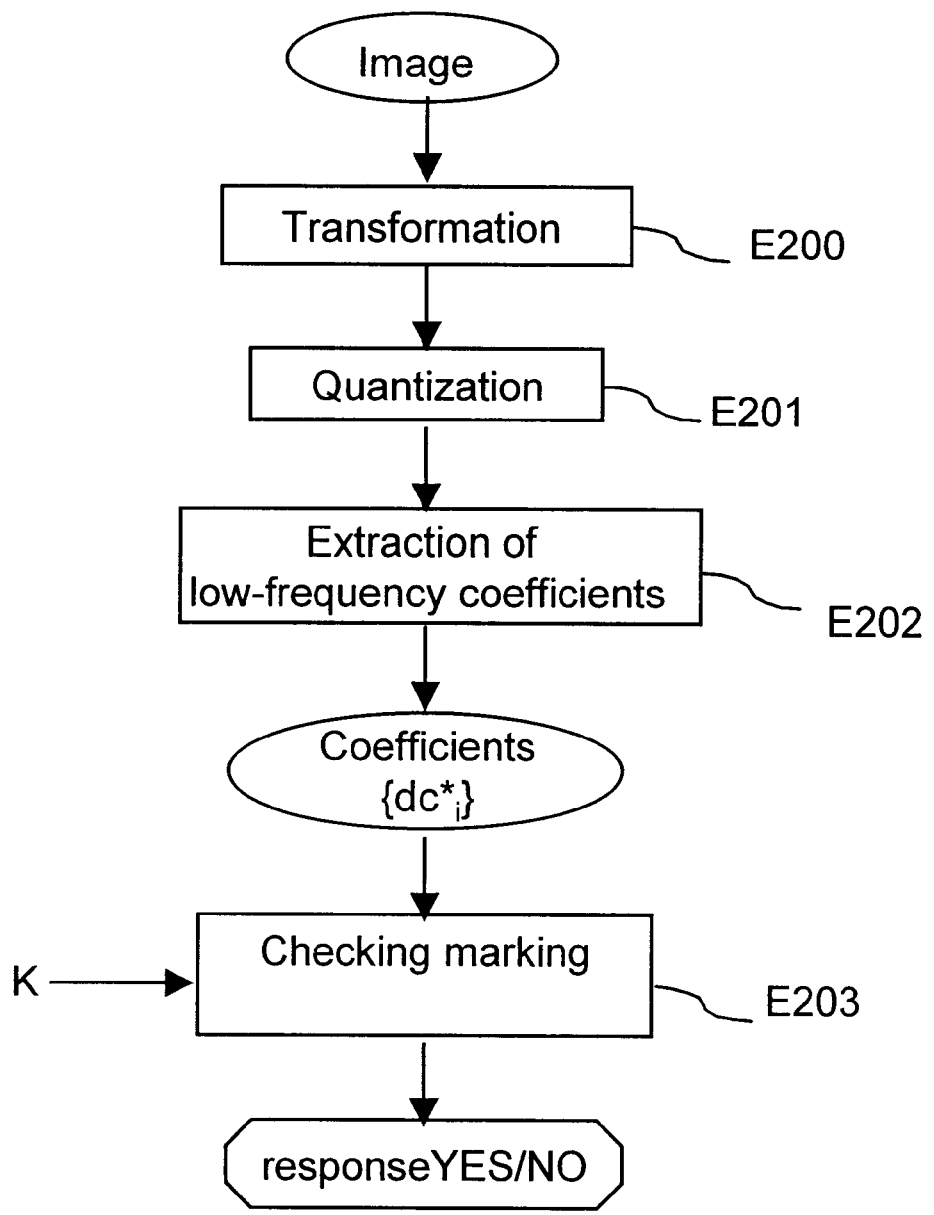
FIG. 14 is a second embodiment of an algorithm for detecting additional information and data, according to the present invention.

FIG. 14 depicts a second watermarking detection mode, which enables a non-compressed image to be processed. This detection includes steps E200 to E203.

Step E200 is a transformation of the non-compressed image, identical to that effected by the circuit 2. The following step E201 is a quantization of the transformed image. This quantization is identical to that performed by the circuit 3.

The following step E202 is the extraction of the low-frequency coefficients in order to form a low-frequency sub-image $\{dc^*_i\}$.

The following step E203 is identical to the previously described step E101.

The corresponding detection device has transformation, quantization, coefficient extraction and checking means.

Figure 15:
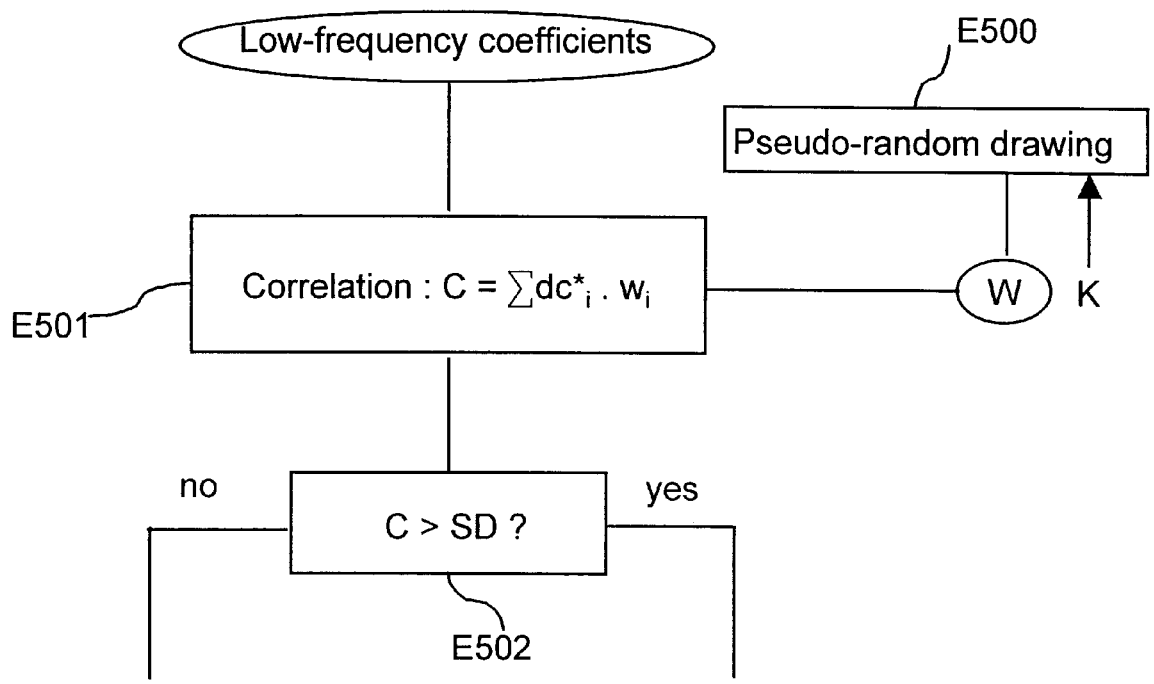
FIG. 15 is a first embodiment of an algorithm for seeking additional information in data, used in the algorithm in FIG. 14.

FIG. 15 depicts the first embodiment of watermarking checking in an image (step E101 or E203). This checking corresponds to the first mode of inserting the watermarking in the image and includes steps E500 to E502.

Step E500 is a pseudo-random drawing identical to step E41 previously described and results in a pseudo-random signal W having a number of coefficients $w_i$ equal to the number of coefficients of the sub-image.

At step E501, the correlation $C=\Sigma(dc^*_i \cdot w_i)$ between the sub-image to be processed and the pseudo-random signal W is calculated, and then this quantity is compared with a decision threshold SD at step E502.

The result of the comparison makes it possible to decide whether or not the processed image includes the sought-for watermarking.

Figure 16:
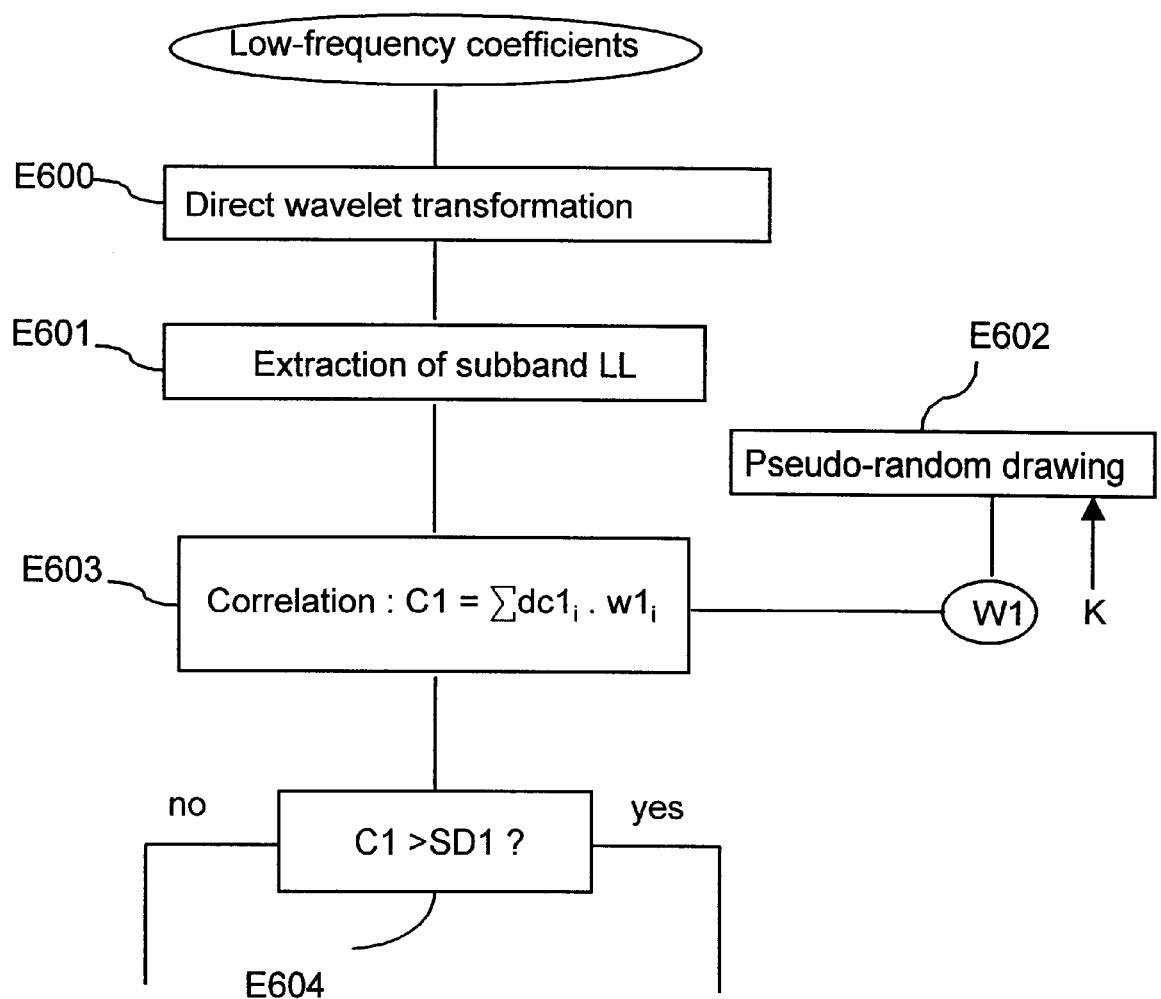
FIG. 16 is a second embodiment of an algorithm for seeking additional information in data, used in the algorithm in FIG. 14.

FIG. 16 depicts the second embodiment of watermarking checking in an image (step E101 to E202). This checking corresponds to the second mode of inserting the watermarking in the image and includes steps E600 to E604.

Step E600 is a multispectral breakdown of the sub-image of the low-frequency coefficients, identical to that effected at step E400. The following step E601 is the extraction of the sub-band with the lowest frequency, as at step E401. The coefficients of the sub-band of the lowest frequency are denoted $dc1_i$.

Step E602 is a pseudo-random drawing similar to that of step E500, except that the number of coefficients drawn is here equal to the number of coefficients of the sub-band signal determined at step E601. Step E602 results in the watermarking signal W1, whose coefficients are denoted $w1_i$.

The following step E603 is a calculation of correlation $C1=\Sigma(dc1_i \cdot w1_i)$ between the sub-band signal and the pseudo-random signal W1. This quantity is compared with a decision threshold SD1 at step E604.

The result of the comparison makes it possible to decide whether or not the processed image includes the sought-for watermarking.

Figure 17:
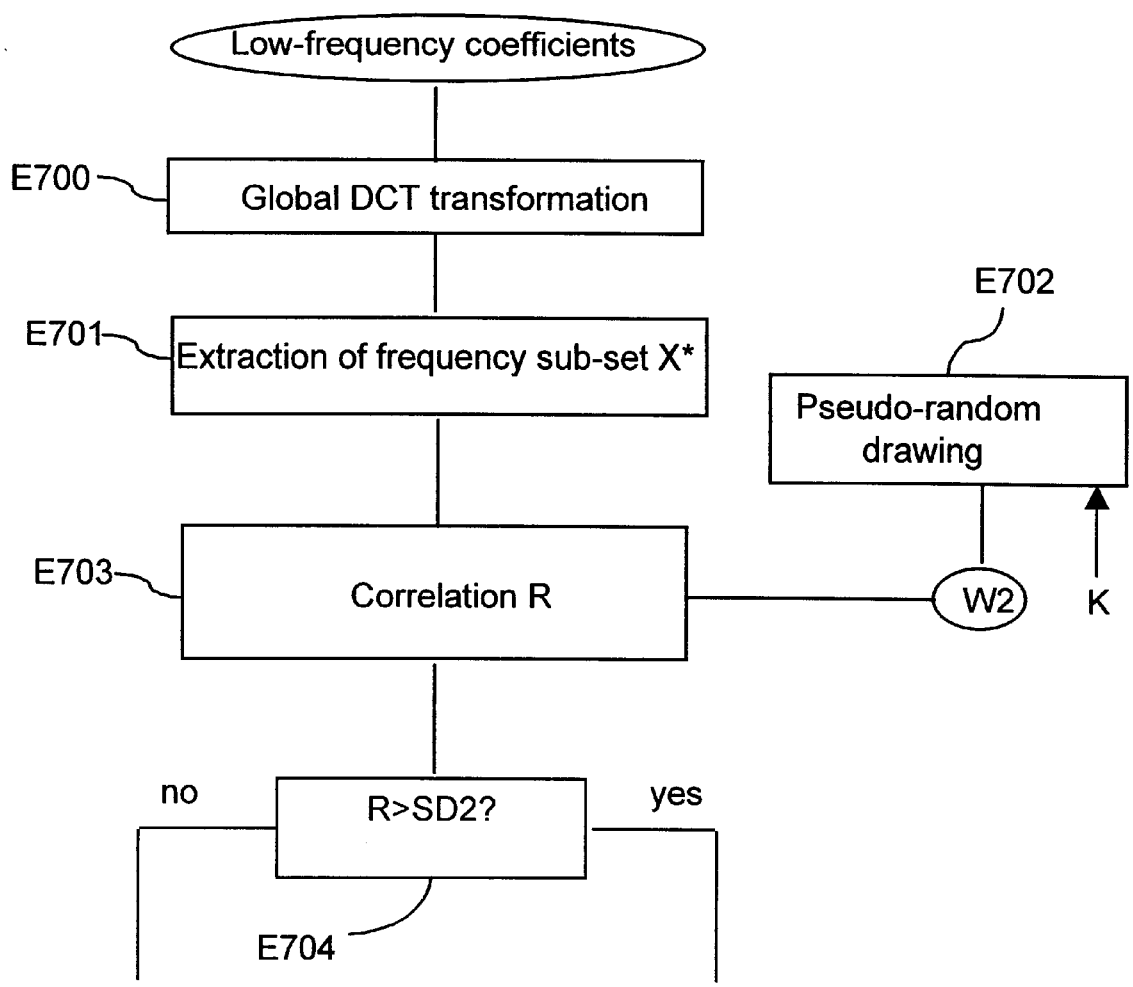
FIG. 17 is a third embodiment of an algorithm for seeking additional information in data, used in the algorithm in FIG. 14.

FIG. 17 depicts the third embodiment of the watermarking checking in the image (step E101 or E203). This checking corresponds to that which is described in FIG. 16, replacing the steps of spectral breakdown and extraction of the modulated coefficients by the corresponding steps of the insertion of the watermarking signal described with reference to FIG. 11 (steps E4001 and E4002).

Step E700 is a spectral breakdown of the sub-image of the low-frequency coefficients, which is here the global DCT applied to the sub-image, identical to that effected at step E4000.

The following step E701 is an extraction of a subset of frequency coefficients, identical to the corresponding step E4002 of FIG. 11. The frequency coefficients extracted are denoted $X^*_i$.

Step E702 is a pseudo-random drawing initialised by the key K, the purpose of which is to form the watermarking signal W2, the coefficients of which are denoted $w2_i$.

Step E703 is the calculation of the correlation between the extracted frequency coefficients $X^*_i$ and the watermarking signal W2.

The calculated quantity is: $R=\Sigma X^*_i w2_i$.

It should be noted that other known statistical tests can be used in place of the correlation calculation.

The following step E704 consists of the comparison of the value of the correlation R with a predetermined threshold SD2. The result of this comparison makes it possible to decide whether or not the processed image contains the sought-for watermarking W2.

Naturally, the present invention is in no way limited to the embodiments described and depicted, but quite the contrary encompasses any variant within the capability of a person skilled in the art.

What is claimed is:

1. A method of inserting an additional information item in a set of digital data representing physical quantities, the data having been processed by transformation, quantization and entropic coding in order to be compressed, said method comprising the steps of:

extracting a subset of low-frequency coefficients from the set of data, entropic decoding of the coefficients of the subset, modulation of the decoded coefficients by a signal representing the additional information item, so as to form quantized watermarked coefficients, entropic coding of the watermarked coefficients, and insertion of the watermarked encoded coefficients in place of the coefficients of the subset, in the set of data.

2. An insertion method according to claim 1, characterised in that the signal representing the additional information item is a pseudo-random signal.

3. An insertion method according to either of claim 1 or 2, characterised in that the modulation step is performed with quantized quantities.

4. An insertion method according to either of claims 1 or 2, characterized in that the modulation step includes a spectral breakdown of the set of low-frequency coefficients in order to extract therefrom a second subset of low-frequency coefficients, the modulation of the coefficients of the second subset by the signal representing the additional information item, and a transformation, the reverse of the spectral breakdown, of the subset of low-frequency coefficients containing the second subset of modulated coefficients.

5. An insertion method according to claim 4, characterised in that the second subset of low-frequency coefficients is the set of coefficients with the lowest frequency resulting from the spectral breakdown.

6. A digital signal processing apparatus, characterised in that it has means adapted to implement the insertion method according to either of claims 1 or 2.

7. A digital photographic apparatus, characterised in that it has means adapted to implement the insertion method according to either of claims 1 or 2.

8. A digital camera, characterised in that it has means adapted to implement the insertion method according to either of claims 1 or 2.

9. A database management system, characterised in that it has means adapted to implement the insertion method according to either of claims 1 or 2.

10. A computer, characterised in that is has means adapted to implement the insertion method according to either of claims 1 or 2.

11. A scanner, characterised in that it has a means adapted to implement the insertion method according to either of claims 1 or 2.

12. A medical imaging appliance, characterised in that it has means adapted to implement the insertion method according to either of claims 1 or 2.

13. A storage medium storing a program for implementing the insertion method according to claim 1.

14. A device for inserting an additional information item in a set of digital data representing physical quantities, the data having been processed by transformation, quantization and entropic coding in order to be compressed, said device comprising:

means for extraction of a subset of low-frequency coefficients from the set of data, means for entropic decoding of the coefficients of the subset, means for modulation of the decoded coefficients by a signal representing the additional information item, so as to form quantized watermarked coefficients, means for entropic coding of the watermarked coefficients, and means for insertion of the watermarked encoded coefficients in place of the coefificients of the subset, in the set of data, 15. An insertion device according to claim 14, characterised in that it is adapted to modulate the decoded coefficients by a signal representing the additional information item which is a pseudo-random signal.

16. An insertion device according to either of claims 14 or 15, characterised in that said modulation means is adapted to effect a modulation with quantized quantities.

17. An insertion device according to either of claims 14 or 15, characterised in that said extraction means is adapted to select a first set of low-frequency coefficients, and to effect a spectral breakdown of this first set in order to extract therefrom the subset of low-frequency coefficients.

18. An insertion device according to claim 17, characterised in that said extraction means is adapted to extract a subset of low-frequency coefficients which is the set of the coefficients with the lowest frequency resulting from the spectral breakdown.

19. An insertion device according to either of claims 14 or 15, characterized in that said extraction, entropic decoding, modulation, entropic coding and insertion means are incorporated in:

a microprocessor;

a read only memory containing a program for inserting an additional information item; and a random access memory containing registers adapted to record variables modified during the running of the program.

20. A digital signal processing apparatus, characterised in that it has an insertion device according to either of claims 14 or 15.

21. A digital photographic apparatus, characterised in that it has an insertion device according to either of claims 14 or 15.

22. A digital camera, characterised in that it has an insertion device according to either of claims 14 or 15.

23. A database management system, characterised in that it has an insertion device according to either of claims 14 or 15.

24. A computer, characterised in that it has an insertion device according to either of claims 14 or 15.

25. A scanner, characterised in that it has an insertion device according to either of claims 14 or 15.

26. A medical imaging appliance, characterised in that it has an insertion device according to either of claims 14 or 15.

27. A method for detecting an additional information item in a set of digital data representing physical quantities, the data having been processed by transformation, quantization and entropic coding in order to be compressed prior to the insertion of the additional information item, said method comprising the steps of:

extracting a subset of low-frequency coefficients from the set of data, entropic decoding of the coefficients of the subset, calculation of the correlation between the subset and a signal representing the additional information item, and comparison of the result of the correlation with a threshold.

28. A storage medium storing a program for implementing the detection method according to claim 27.

29. A storage medium according to claim 13 or 28, characterized in that said storage medium is a floppy-disk or a CD-ROM.

30. A method for detecting an additional information item in a set of digital data representing physical quantities, the data having been processed by transformation, quantization and entropic coding in order to be compressed prior to the insertion of the additional information item, the data next having been decompressed, said method comprising the steps of:

transforming the set of data, quantizing the transformed set of data, extracting a subset of low-frequency coefficients of the set of transformed and quantized data, calculating the correlation between the subset and a signal representing the additional information item, and comparing the result of the correlation with a threshold.

31. A digital signal processing apparatus, characterised in that it has means adapted to implement the detection method according to either of claims 27 or 30.

32. A digital photographic apparatus, characterised in that it has means adapted to implement the detection method according to either of claims 27 or 30.

33. A digital camera, characterised in that it has means adapted to implement the detection method according to either of claims 27 or 30.

34. A database management system, characterized in that it has means adapted to implement the detection method according to either of claims 27 or 30.

35. A computer, characterised in that is has means adapted to implement the detection method according to either of claims 27 or 30.

36. A scanner, characterised in that it has means adapted to implement the detection method according to either of claims 27 or 30.

37. A medical imaging appliance, characterised in that it has means adapted to implement the detection method according to either of claims 27 or 30.

38. A device for detecting an additional information item in a set of digital data representing physical quantities, the data having been processed by transformation, quantization and entropic coding in order to be compressed prior to the insertion of the additional information item, said device comprising:

means for extraction of a subset of low-frequency coefficient, from the set of data, means for entropic decoding of the coefficients of the subset, means for calculation of the correlation between the subset and a signal representing the additional information item, and means for comparison of the result of the correlation with a threshold.

39. A device according to claim 38, characterised in that said extraction, entropic decoding, calculation and comparison means are incorporated in:

a microprocessor;

a read only memory containing a program for inserting an additional information item; and a random access memory containing registers adapted to record variables modified during the running of the program.

40. A device for detecting an additional information item in a set of digital data representing physical quantities, the data having been processed by transformation, quantization and entropic coding in order to be compressed prior to the insertion of the additional information item, said device comprising:

means for transforming the set of data, means for quantizing the transformed set of data, means for extracting a subset of low-frequency coefficients of the set of transformed and quantized data, means for calculating the correlation between the subset and a signal representing the additional information item, and means for comparing the result of the correlation with a threshold.

41. A device according to claim 40, characterised in that said transforming, quantizing, extracting, calculating, and comparing means are incorporated in:

a microprocessor;

a read only memory containing a program for inserting an additional information item; and a random access memory containing registers adapted to record variables modified during the running of the program.

42. A digital signal processing apparatus, characterised in that it has a detection device according to one of claims 38 to 41.

43. A digital photographic apparatus, characterised in that it has a detection device according to one of claims 38 to 41.

44. A digital camera, characterised in that is has a detection device according to one of claims 38 to 41.

45. A database management system, characterised in that it has a detection device according to one of claims 38 to 41.

46. A computer, characterised in that it has a detection device according to one of claims 38 to 41.

47. A scanner, characterised in that it has a detection device according to one of claims 38 to 40.

48. A medical imaging appliance, characterised in that it has a detection device according to one of claims 38 to 41.

* * * * *

UNITED STATES PATENT AND TRADEMARK OFFICE
CERTIFICATE OF CORRECTION

PATENT NO. : 6,674,873 B1
DATED : January 6, 2004
INVENTOR(S) : Ioana Donescu et al.

It is certified that error appears in the above-identified patent and that said Letters Patent is hereby corrected as shown below:

Title page,
Item [56], References Cited, OTHER PUBLICATIONS, second reference, "1673-16836" should read -- 1673-1686 --.

Column 7,
Line 2, "dc," should read -- $dc_1$ --.
Line 63, "it" should read -- is --.

Column 8,
Line 64, "Step El" should read -- Step E1 --.

Column 9,
Line 43, "$D_i$" should read -- $D_1$ --.

Column 10,
Line 35, "$dc_{i+\alpha_i} \bullet wi$" should read -- $dc_i + \alpha_i \bullet w_i$ --.

Column 12,
Line 44, "closes" should read -- closed --.

Column 13,
Line 44, "is has" should read -- it has --.
Line 47, "has a" should read -- has --.

Column 15,
Line 4, "coefificients" should read -- coefficients --.

Column 17,
Line 28, "is has" should read -- it has --.
Line 44, "coefficient," should read -- coefficients --.

Column 18,
Line 40, "is has" should read -- it has --.

UNITED STATES PATENT AND TRADEMARK OFFICE
CERTIFICATE OF CORRECTION

PATENT NO. : 6,674,873 B1
DATED : January 6, 2004
INVENTOR(S) : Ioana Donescu et al.

It is certified that error appears in the above-identified patent and that said Letters Patent is hereby corrected as shown below:

<u>Column 18 (cont'd),</u>
Line 47, "40" should read -- 41 --.

Signed and Sealed this

Thirty-first Day of May, 2005

JON W. DUDAS
*Director of the United States Patent and Trademark Office*